US006182783B1

United States Patent
Bayley

(10) Patent No.: US 6,182,783 B1
(45) Date of Patent: Feb. 6, 2001

(54) SYSTEM FOR PROTECTING A VEHICLE OCCUPANT DURING A VEHICLE ROLLOVER CONDITION

(75) Inventor: Gregory S. Bayley, Dryden, MI (US)

(73) Assignee: TRW Vehicle Safety Systems Inc., Lyndhurst, OH (US)

(*) Notice: Under 35 U.S.C. 154(b), the term of this patent shall be extended for 0 days.

(21) Appl. No.: 09/121,234

(22) Filed: Jul. 23, 1998

(51) Int. Cl.⁷ .................................................. B60R 21/00
(52) U.S. Cl. ...................... 180/282; 180/271; 280/5.514; 280/755; 280/806; 297/216.16; 297/216.17
(58) Field of Search .................................... 280/806, 755, 280/5.5, 5.514, 756; 180/271, 282; 297/216.16, 216.17

(56) References Cited

U.S. PATENT DOCUMENTS

| 5,261,506 | * | 11/1993 | Jost | 280/806 |
| 5,492,368 | * | 2/1996 | Pywell et al. | 280/806 |
| 5,564,520 | * | 10/1996 | Forsythe | 297/216.1 |
| 5,775,726 | * | 7/1998 | Timothy et al. | 280/730.1 |

* cited by examiner

*Primary Examiner*—Eric Culbreth
(74) *Attorney, Agent, or Firm*—Tarolli, Sundheim, Covell, Tummino & Szabo L.L.P.

(57) ABSTRACT

A vehicle occupant protection system (10) for helping to protect a vehicle occupant (33) during a vehicle rollover condition includes a rollover sensor (68) for sensing a vehicle rollover condition. The rollover sensor (68) provides a signal indicative of the vehicle rollover condition. The system also includes a vehicle body portion (14) defining a vehicle occupant compartment (16). The vehicle body portion (14) also includes at least one actuatable power device (44; 52; 56) for, when actuated, helping to protect the vehicle occupant (33) in a rollover condition by modifying a characteristic of the vehicle body portion (14). A controller (28) actuates the power device (44; 54; 56) in response to the rollover sensor signal.

11 Claims, 2 Drawing Sheets

SYSTEM FOR PROTECTING A VEHICLE OCCUPANT DURING A VEHICLE ROLLOVER CONDITION

TECHNICAL FIELD

The present invention relates to a vehicle occupant protection system, and more particularly to a system for protecting a vehicle occupant during a vehicle rollover condition.

BACKGROUND OF THE INVENTION

Numerous types of vehicle occupant protection systems have been developed. Such systems typically act on the vehicle occupant to restrain the occupant during a crash event. The restraint is provided by an inflatable occupant restraint device and/or a seat belt.

SUMMARY OF THE INVENTION

The present invention is directed to a vehicle occupant protection system for helping to protect a vehicle occupant during a vehicle rollover condition. The system includes a rollover sensor for sensing a vehicle rollover condition. The rollover sensor provides a signal indicative of the vehicle rollover condition. A vehicle body portion, which defines a vehicle occupant compartment, has at least one actuatable power device. When actuated, the actuatable power device helps to protect the vehicle occupant in a rollover condition by modifying a condition of the vehicle body portion. The system also includes a controller for actuating the power device in response to the rollover sensor signal.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
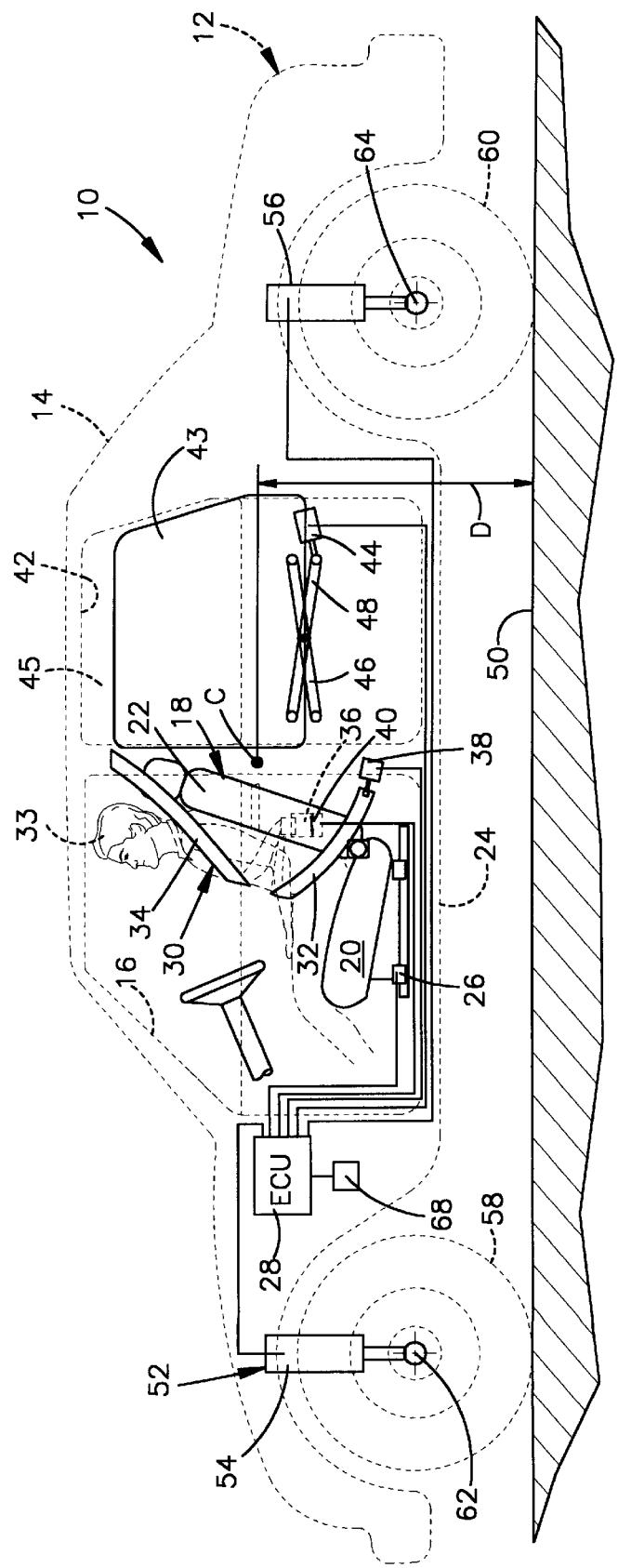
FIG. 1 is a schematic view of a system in accordance with the present invention.
Figure 2:
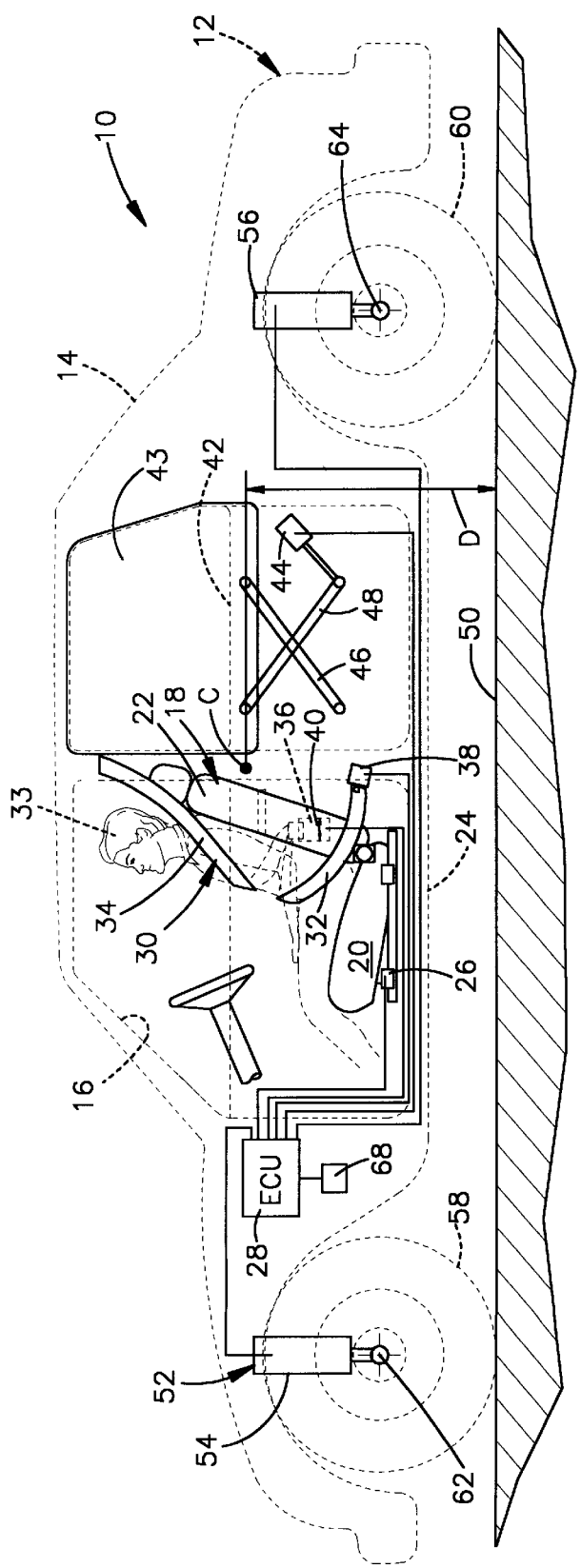
FIG. 2 is a view of the system of FIG. 1, illustrating an alternative condition of the system.
Figure 3:
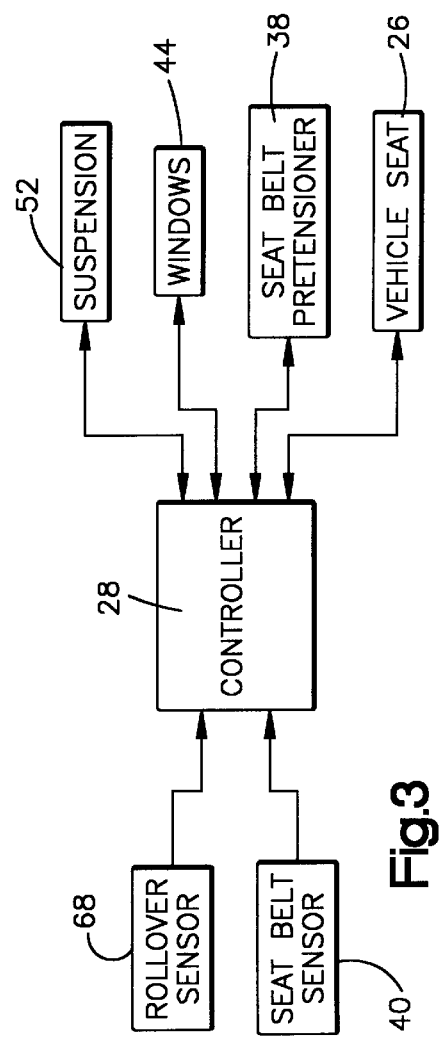
FIG. 3 is a schematic block diagram of a system in accordance with the present invention.

A preferred embodiment of a vehicle occupant protection system, generally indicated at 10, is illustrated in FIGS. 1–3. Referring to FIGS. 1 and 2, the system 10 is installed in a vehicle 12 having a vehicle body portion 14, shown in phantom. Among other things, the vehicle body portion 14 defines a vehicle occupant compartment 16 in which various actuatable devices for convenience, safety and comfort are disposed.

A vehicle seat, indicated at 18, having a lower seat portion 20 and a seat back portion 22 is disposed in the vehicle occupant compartment 16 and mounted to a lower portion 24 of the vehicle body portion 14. Preferably, the seat 18 is vertically adjustable by an actuatable power device 26, suitably including a motor, for adjusting the height of the lower seat portion 20 relative to the lower portion 24 of the vehicle body portion 14. The seat 18 is adjustable between a full-up position and a full-down position. The power seat device 26 is electrically connected to an electronic control unit (ECU) or controller 28, which controls the actuation of the power seat device 26. Typically, the power seat device 26 also includes a switch (not shown), by which the occupant may manually adjust the vertical height of the seat 18 to a desired position.

The controller 28 preferably is a microcomputer, but may also comprise a plurality of discrete circuits, circuit components and/or an application specific integrated circuit (ASIC), configured to accomplish the desired functions as further described below.

The system 10 of FIGS. 1 and 2 also includes a seat belt, indicated at 30, having webbing portions 32 and 34 that may be positioned around the lap and chest, respectively, of an occupant 33 of the seat 18. The seat belt 30 includes a tongue (not shown) attached to the seat belt 30 between the webbing portions 32 and 34. The tongue may be received within a buckle 36 for maintaining the position of the seat belt webbing portions 32 and 34 around the occupant 33. The buckle 36 includes a switch 40, which is a sensor for detecting the presence or absence of the seat belt tongue within the buckle 36. The seat belt buckle switch 40 is electrically coupled to the controller 28 for providing a signal indicating whether the tongue is received within the buckle 36.

The seat belt 30 is operatively coupled to an actuatable seat belt pretensioner device 38, which may be actuated to tighten the seat belt 30 around the vehicle occupant 33. The seat belt pretensioner 38 is electrically coupled to the controller 28 which actuates the pretensioner 38. The pretensioner 38 may be any known seat belt pretensioner mechanism.

The vehicle body portion 14 also includes at least one window frame 42 in a door of the vehicle 12. A window 43 is moveable relative to the window frame 42. The window 43 may be lowered or raised to provide or block access, respectively, between the vehicle occupant compartment 16 and the atmosphere outside the vehicle body portion 14. When the window 43 is lowered, a window opening 45 is formed in the vehicle body portion 14 between the frame 42 and the window 43, as shown in FIG. 1.

The window 43 is lowered and raised by an electrically actuatable mechanism 44 mounted within the corresponding door of the vehicle 12. Typically, a switch (not shown) is mounted to at least one of the vehicle doors for actuating the mechanism 44 to drive the window 43 up or down. The electrically actuatable mechanism 44 also is electrically coupled to the controller 28. The electrically actuatable mechanism 44, which includes an electrical motor, is operatively coupled to one end of at least one of two connecting arms 46 and 48 interconnected in the shape of an X. Another end of each arm 46 and 48 is connected to a lower portion of the window 43. Upon actuation of the electrically actuatable mechanism 44, the arms 46 and 48 pivot relative to one another to move the window 43 vertically.

The vehicle body portion 14 has a center of gravity, indicated at C, which is spaced a distance, indicated at D, above the ground 50. The vehicle 12 also is equipped with an actuatable system for raising and lowering the center of gravity C of the vehicle body portion 14 between full-up and full-down positions. For example, the vehicle 12 may include an actuatable suspension system, indicated at 52, having a plurality of controllable strut devices 54 and 56, each associated with a different vehicle wheel 58 and 60, respectively. While only two such struts 54 and 56 and associated wheels 58 and 60 are illustrated in the side elevation of FIGS. 1 and 2, it is to be understood that there is one such strut device for each wheel of the vehicle 12. The controllable strut devices 54 and 56 are attached to the vehicle body portion 14 and respective wheel axles 62 and 64. Each actuatable strut device 54 and 56 also is electrically coupled to the controller 28. The controller 28 may independently actuate each strut device 54 and 56 to raise or lower the vehicle body 14 a desired amount.

The protection system 10 also includes a rollover sensor 68 for sensing a vehicle rollover condition. Such a rollover sensor 68 is known in the art. The rollover sensor 68 is electrically coupled to the controller 28. The rollover sensor 68 may include one or more sensing devices for sensing vehicle dynamics and/or vehicle attitude, such as the pitch, roll and yaw of the vehicle. The rollover sensor 68 also may sense the angular roll rates of the vehicle 12. The rollover sensor 68 thus provides a signal indicative of a vehicle rollover condition to the controller 28.

The controller 28, in response to the rollover sensor signal, determines whether a vehicle rollover condition exists. The controller 28 is configured to distinguish between an actual rollover condition, or a situation in which a rollover is likely, and a situation in which the vehicle 12 is simply experiencing a relatively stable change in vehicle attitude, such as a sharp incline due to going over a steep bump or hill. This determination may be based upon threshold values established through empirical testing for a particular vehicle.

In response to the rollover sensor signal indicating that a vehicle rollover condition exists, the controller 28 effects actuation of at least one power device, such as the electrically actuatable mechanism 44 or a strut device 54 or 56 which modifies a characteristic of the vehicle body portion 14. The controller 28 preferably actuates both the electrically actuatable mechanism 44 and the suspension system 52 during a rollover condition.

The controller 28 effects actuation of the electric suspension system 52, which includes struts 54 and 56, to lower rapidly the center of gravity C of the vehicle body portion 14, such as to the full-down position shown in FIG. 2. It has been determined that lowering the center of gravity C of the vehicle body portion 14 at a rapid rate tends to inhibit vehicle rollover, thereby helping to protect the vehicle occupant 33. Depending upon the particular circumstances of the rollover condition, the controller 28 might actuate only some of the struts, such as struts 54 or 56, to lower only part of the vehicle body portion 14.

During a rollover condition, the controller 28 also may cause the window 43, and preferably every window of the vehicle 12, to be raised completely to close the window opening 45, as is shown in FIG. 2. Raising the windows protects the vehicle occupants by providing an additional barrier between the vehicle occupant compartment 16 and the surrounding atmosphere. This helps to prevent an unbelted vehicle occupant from exiting the vehicle 12 through an adjacent window opening 45. This also prevents the occupant's limbs from extending through a window opening 45, regardless of whether the occupant 33 is belted or unbelted.

Preferably, the controller 28 also actuates the power seat device 26 in response to the rollover sensor signal indicating a rollover condition. This lowers the vehicle seat 18 to the full-down position, as is shown in FIG. 2. Lowering the vertical position of the seat 18 spaces the head of the vehicle occupant 33 from the ceiling of the vehicle 12.

When the occupant 33 is belted, as indicated by the switch 40, it is also desirable for the controller 28 to actuate the seat belt pretensioner device 38. The pretensioner 38 tightens the seat belt 30 around the vehicle occupant 33 in response to the rollover sensor signal indicating a rollover condition. The pretensioner 38 thus urges the occupant 33 against the seat 18.

Preferably, the controller actuates both the seat pretensioner device 38 and the power seat device 26 in response to the rollover sensor signal. Lowering the vehicle seat 18 to space the occupant 33 from the ceiling and tightening the seat belt 30 around the occupant 33 reduces the likelihood that the occupant 33 will experience injury during a rollover condition. Accordingly, the seat belt pretensioner 38 and the power seat device 26 act on the vehicle occupant 33 in the event of a rollover condition.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant protection system for helping to protect a vehicle occupant during a vehicle rollover condition, said system comprising:

a rollover sensor for sensing a vehicle rollover condition, said rollover sensor providing a signal indicative of the vehicle rollover condition;

a vehicle body portion defining a vehicle occupant compartment for the vehicle occupant, said vehicle body portion having at least one actuatable first power device for, when actuated, helping to protect the vehicle occupant in a rollover condition by modifying a characteristic of said vehicle body portion; and a controller for actuating said first power device in response to said rollover sensor signal, said vehicle body portion having a center of gravity and said characteristic of said vehicle body portion comprising the height of the center of gravity of said vehicle body portion, said first power device lowering the height of said center of gravity of said vehicle body portion in response to said rollover sensor signal.

2. The vehicle occupant protection system of claim 1 wherein said first power device comprises an actuatable vehicle suspension device.

3. A vehicle occupant protection system for helping to protect a vehicle occupant during a vehicle rollover condition, said system comprising:

a rollover sensor for sensing a vehicle rollover condition, said rollover sensor providing a signal indicative of the vehicle rollover condition;

a vehicle body portion defining a vehicle occupant compartment for the vehicle occupant, said vehicle body portion having at least one actuatable first power device for, when actuated, helping to protect the vehicle occupant in a rollover condition by modifying a characteristic of said vehicle body portion; and a controller for actuating said first power device in response to said rollover sensor signal, said vehicle body portion including at least one window frame and a window movable relative to said window frame to define a window opening in said vehicle body portion, said characteristic of said vehicle body portion comprising access between said vehicle occupant compartment and the atmosphere outside said vehicle body portion through said window opening, said first power device moving said window to close said window opening in response to said rollover sensor signal.

4. The vehicle occupant protection system of claim 3 wherein said first power device comprises an electrically actuatable mechanism operatively coupled to said at least one window for moving said window.

5. A vehicle occupant protection system for helping to protect a vehicle occupant during a vehicle rollover condition, said system comprising:

a rollover sensor for sensing a vehicle rollover condition, said rollover sensor providing a signal indicative of the vehicle rollover condition;

a vehicle body portion defining a vehicle occupant compartment for the vehicle occupant, said vehicle body portion having at least one actuatable power device for, when actuated, helping to protect the vehicle occupant in a rollover condition by modifying a characteristic of said vehicle body portion; and a controller for actuating said power device in response to said rollover sensor signal, said vehicle body portion comprising at least one window frame and a window movable relative to said window frame to provide a window opening in said vehicle body portion, and said vehicle body portion having a center of gravity, said characteristic of said vehicle body portion comprising both the height of said center of gravity of said vehicle body portion and access between said vehicle occupant compartment and the atmosphere outside said vehicle body portion through said window opening;

a first actuatable power device comprising a mechanism for lowering the height of said center of gravity of said vehicle body portion in response to said rollover sensor signal; and a second actuatable power device comprising means for moving said window to close said window opening in response to said rollover sensor signal.

6. A vehicle occupant protection system for helping to protect a vehicle occupant during a vehicle rollover condition, said system comprising:

rollover sensor means for sensing a vehicle rollover condition, said rollover sensor means providing a signal indicative of said vehicle rollover condition;

a vehicle body portion defining a vehicle occupant compartment;

first means for modifying at least one characteristic of said vehicle body portion to help protect the vehicle occupant during a vehicle rollover condition; and control means for selectively effecting actuation of said first means to modify said at least one characteristic of said vehicle body portion in response to said signal of said rollover sensor means, thereby helping to protect the vehicle occupant, said vehicle occupant compartment including at least one window frame and an associated window movable relative to said window frame to provide a window opening in said vehicle body portion, said window frame positioned in said vehicle body portion between said vehicle occupant compartment and the atmosphere outside said vehicle body portion, said at least one characteristic of said vehicle body portion comprising access between said vehicle occupant compartment and the atmosphere outside said vehicle body portion through said window opening, said first means moving said window to close said window opening in response to said signal of said rollover sensor means.

7. A vehicle occupant protection system for helping to protect a vehicle occupant during a vehicle rollover condition, said system comprising:

a rollover sensor for sensing a vehicle rollover condition, said rollover sensor providing a signal indicative of the vehicle rollover condition;

a vehicle body portion defining a vehicle occupant compartment for the vehicle occupant, said vehicle body portion having a plurality of simultaneously actuatable power devices for, when actuated, helping to protect the vehicle occupant in a rollover condition by modifying characteristics of said vehicle body portion, said plurality of simultaneously actuatable power devices including a first actuatable power device and a second actuatable power device;

a controller for actuating said plurality of simultaneously actuatable power devices in response to said rollover sensor signal; and a member positioned within the vehicle occupant compartment which acts on the vehicle occupant to protect the vehicle occupant during a vehicle rollover condition;

said second actuatable power device for, when actuated, protecting the vehicle occupant during a vehicle rollover condition by causing said member to act on the vehicle occupant in response to said rollover sensor signal.

8. The vehicle occupant protection system of claim 7 further being defined by:

said member comprising a seat belt; and said second actuatable power device comprising a seat belt pretensioner device coupled to said seat belt for tightening said seat belt around the vehicle occupant in response to said rollover sensor signal.

9. The vehicle occupant protection system of claim 7 further being defined by:

said member comprising a vehicle seat; and said second actuatable power device comprising means for lowering said vehicle seat to lower the vehicle occupant in response to said rollover sensor signal.

10. A vehicle occupant protection system for helping to protect a vehicle occupant during a vehicle rollover condition, said system comprising:

rollover sensor means for sensing a vehicle rollover condition, said rollover sensor means providing a signal indicative of said vehicle rollover condition;

a vehicle body portion defining a vehicle occupant compartment;

means for simultaneously modifying a plurality of characteristics of said vehicle body portion to help protect the vehicle occupant during a vehicle rollover condition, said means including a first means and a second means which acts on the vehicle occupant for helping to protect the vehicle occupant during a vehicle rollover condition; and control means for selectively effecting actuation of said first and second means in response to said signal of said rollover sensor means, thereby helping to protect the vehicle occupant.

11. A vehicle occupant protection system for helping to protect a vehicle occupant during a vehicle rollover condition, said system comprising:

rollover sensor means for sensing a vehicle rollover condition, said rollover sensor means providing a signal indicative of said vehicle rollover condition;

a vehicle body portion defining a vehicle occupant compartment, said vehicle body portion having a center of gravity;

means for simultaneously modifying a plurality of characteristics of said vehicle body portion to help protect the vehicle occupant during a vehicle rollover condition, said means including a first means, said plurality of characteristics of said vehicle body portion including the height of said center of gravity of said vehicle body portion, said first means lowering the height of said center of gravity of said vehicle body portion in response to said signal of said rollover sensor means, and control means for selectively effecting actuation of said first means in response to said signal of said rollover sensor means, thereby helping to protect the vehicle occupant.

\* \* \* \* \*